P. Gallagher,
Chair Bottom,
№ 22,419. Patented Dec. 28, 1858.
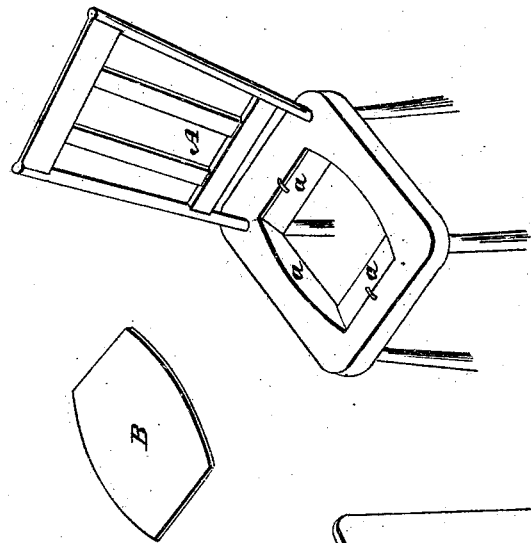
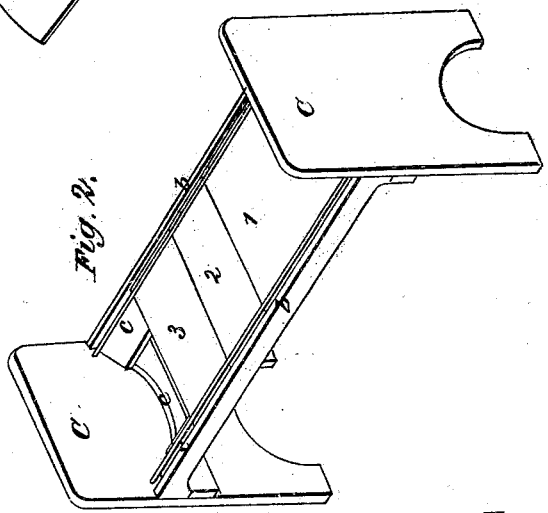
Witnesses.
William Johnston
D. G. Weaver
Inventor.
Patrick Gallagher.

UNITED STATES PATENT OFFICE.

PATRICK GALLAGHER, OF PLEASANT UNITY, PENNSYLVANIA.

SPRING-BOTTOM FOR CHAIRS AND OTHER SEATS.

Specification of Letters Patent No. 22,419, dated December 28, 1858.

*To all whom it may concern:*

Be it known that I, PATRICK GALLAGHER, of Pleasant Unity, in the county of Westmoreland and State of Pennsylvania, have invented a new and useful Improvement in Spring-Bottoms for Chairs, Car-Seats, Sofas, &c.; and I do hereby declare the following to be a full, clear, and exact description of the same, reference being had to the accompanying drawings, making a part of this specification, in which—

Figure 1 represents a common chair, and showing how the spring bottom may be applied thereto. Fig. 2 represents a car or carriage seat with the spring bottom applied to it.

I am aware that, spring seats of many kinds have been used, but do not know that, the bottom of the seat itself has been made of a spring plate, as I propose to make them. I do not apply springs to the seat. Such application is well known, but I make the seat or bottom a spring within itself. Or in other words I make the spring act as a spring and as a bottom also to the seat, thus making it perform two functions, while all other spring seats of which I have knowledge, must have several different pieces or attachments to constitute a seat and spring. My spring is not united to or made a part of, the frame or seat, as in all other spring seats, for it is the frame, spring, and seat within itself. When it is laid upon the frame of the chair, car or carriage seat, or sofa, the spring bottom is made.

The nature of my invention, therefore, consists, in making a spring bottom for seats of any kind, out of a spring plate of steel, or cold rolled iron, having the proper strength and elasticity, when said plate constitutes the seat and spring, both within itself.

To enable others skilled in the art to make and use my invention, I will proceed to describe the same with reference to the drawings.

A, may represent a chair of any ordinary kind—the bottom of which is open or in skeleton, and having inclined sides *a*, around the opening, or recesses, onto, or into which a spring plate of metal B, is placed—said plate being made of the form or shape of the opening in the chair bottom. A neat molding may be placed around the edges of the plate to prevent it from rising from the frame, said molding being fastened to the frame, but so that the plate may expand and contract, or yield and play to the weight of the person occupying it. Any fastening, such as pins, rods, slots and screws may be used instead of the moldings. The latter however, are the more ornamental.

C, may represent a car or carriage seat, sofa, or lounge, to which the spring plate bottom, may also be applied. In this case where the seat is so long as to require a longer or heavier plate, than could be readily handled, I propose to make the plate in sections 1, 2, 3, or more. The rails *b, b*, of this seat are beveled off, or recessed as at *c*, to allow the plates to spring, and still maintain their proper places. Cushions can of course be laid over the plates, or covers of any kind, but not so as to interfere with their springing motion. These spring plate bottoms could be advantageously applied to rustic, or "out of doors" cast iron seats, giving them all the ease and comfort of spring bottom chairs, while they are quite as durable as the cast iron frames.

Having thus fully described the nature and object of my invention, what I claim as new and desire to secure by Letters Patent is—

Making the bottoms of chairs or other seats, of spring plate metal, so that when laid loosely upon the frame said plates shall be both a bottom and a spring, substantially as herein set forth.

PATRICK GALLAGHER.

Witnesses:
WILLIAM JOHNSTON,
D. G. WEAVER.